US009554085B2

(12) United States Patent
Iyer et al.

(10) Patent No.: US 9,554,085 B2
(45) Date of Patent: Jan. 24, 2017

(54) METHOD AND DEVICE FOR DYNAMICALLY CONTROLLING QUALITY OF A VIDEO

(71) Applicant: Wipro Limited, Bangalore (IN)

(72) Inventors: Manjunath Ramachandra Iyer, Bangalore (IN); Jijith Nadumuri Ravi, Mumbai (MH); Vijay Garg, Pune (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/813,524

(22) Filed: Jul. 30, 2015

(65) Prior Publication Data
US 2016/0366365 A1    Dec. 15, 2016

(30) Foreign Application Priority Data

Jun. 9, 2015   (IN) ............................ 2866/CHE/2015

(51) Int. Cl.
*H04N 7/01* (2006.01)
*G06F 3/01* (2006.01)
*H04N 5/21* (2006.01)

(52) U.S. Cl.
CPC ............ *H04N 7/0125* (2013.01); *G06F 3/013* (2013.01); *H04N 5/21* (2013.01); *H04N 7/014* (2013.01); *H04N 7/0117* (2013.01); *H04N 7/0137* (2013.01)

(58) Field of Classification Search
USPC .......................... 348/169, 441, 448, 443, 445
See application file for complete search history.

(56) References Cited

U.S. PATENT DOCUMENTS

| 5,422,653 A | 6/1995 | Maguire, Jr. |
| 5,635,947 A | 6/1997 | Iwamoto |
| 8,355,671 B2 | 1/2013 | Kramer et al. |
| 8,428,741 B2 | 4/2013 | Greenberg et al. |
| 2002/0141614 A1 | 10/2002 | Lin |

(Continued)

FOREIGN PATENT DOCUMENTS

JP   2005341076 A  * 12/2005

OTHER PUBLICATIONS

You et al., "Attention Driven Foveated Video Quality Assessment", Jan. 2014, pp. 200-213, vol. 23, No. 1, IEEE.

(Continued)

*Primary Examiner* — Paulos M Natnael
(74) *Attorney, Agent, or Firm* — LeClairRyan, a Professional Corporation

(57) ABSTRACT

Embodiments of the present disclosure disclose a method and a device for dynamically controlling quality of a video displaying on a display associated to an electronic device is provided. The method comprises detecting current eye position of a user and identifying at least one region of interest (ROI) on a display screen of the display device based on the current eye position of the user. Then, the method comprises predicting next position of the eye based on at least one of the current eye position of the user or the at least one ROI. Also, the method comprises converting the SD video in to a high definition (HD) video displayed on the ROI on the display screen associated with the current and next position of the eye. Further, the method comprises displaying the HD video on the ROI of the display screen.

15 Claims, 5 Drawing Sheets

(56) References Cited

U.S. PATENT DOCUMENTS

| | | | |
|---|---|---|---|
| 2005/0111749 A1* | 5/2005 | Kondo | G06T 3/4023 382/261 |
| 2007/0116383 A1* | 5/2007 | De Haan | G06T 3/4007 382/299 |
| 2010/0020240 A1* | 1/2010 | Kageyama | G06T 3/4053 348/581 |
| 2015/0220768 A1* | 8/2015 | Ronnecke | A61B 3/113 348/78 |
| 2015/0338915 A1* | 11/2015 | Publicover | H04N 5/23229 345/633 |

OTHER PUBLICATIONS

Michael Stengel et al., "Optimizing Apparent Display Resolution Enhancement for Arbitrary Videos", 2013, pp. 1-10, IEEE.
Zhou Wang et al., "Video Quality Assessment Using a Statistical Model of Human Visual Speed Perception", Journal, 2007, pp. 1-19, Optical Society of America.
Giuseppe Boccignone, et al., "Bayesian Integration of Face and Low-level Cues for Foveated Video Coding", 2008, pp. 1-14, IEEE.
S.R. Gulliver et al., "Stars In Their Eyes: What Eye-Tracking Reveal About Multimedia Perceptual Quality", 2004, pp. 1-15, Part A, 34 (4), pp. 472-482, IEEE.
Unique Solutions, "What Is Super Resolution?", 2001-2009, Dee Mon, 2009-2015 Infognition Co. Ltd.

* cited by examiner

METHOD AND DEVICE FOR DYNAMICALLY CONTROLLING QUALITY OF A VIDEO

This application claims the benefit of Indian Patent Application Serial No. 2866/CHE/2015 filed Jun. 9, 2015, which is hereby incorporated by reference in its entirety.

FIELD

The present subject matter is related, in general to a display device and more particularly, but not exclusively to systems and methods for dynamically controlling quality of a video displaying on a display associated to an electronic device.

BACKGROUND

Presently, a high definition (HD) video consumes a huge bandwidth for downloading and high computational power to reconstruct, with 30 seconds of data at 120 Hz leads to uncompressed size of more than twenty gigabytes. To reduce the complexity with the HD video, a variety of methods or techniques have been developed.

In general, due to vision foveation, sensitivity of human visual system is confined to a small region around a point of gaze and falls off rapidly around the same. One of the prior arts provides an apparent resolution enhancement for pre-determined regions of the video. In another prior art, a model spanning the optical flow of objects is provided. Another prior art provides an adoption of foviated video coding for video compression, which generate fixation points automatically.

A video with higher frame rates significantly increase the quality of experience. Human eye integrates the rendered images. It calls for providing lesser weight for transient images when the eye is moving. On the same lines, first few frames at new position are to be given lesser weightage.

Consider a user has a digital device, such as, but not limited to, mobile, tablet, personal digital assist and any other device, that can support standard definition (SD) as well as high definition (HD). However, due to bandwidth issue the device is unable to support or render HD quality video. The SD video may take about 1-2.5 Mbps for transmission, while the HD video may take in the range of 12-16 Mbps, which is about 10 times.

The existing devices or solutions do not render high quality video with limited bandwidth. This may be relevant for any consumer of entertainment video, education, medical image, police patrolling, marketing research, advertising, and social networking, who often find bandwidth issues for the consumption of high quality video content Hence, there exists a need to have a device to provide high quality (HD) video with limited bandwidth, which is certainly not sufficient to support HD.

SUMMARY

Disclosed herein is a method and device for managing compliance of one or more network devices. The method comprises receiving one or more configuration changes of the one or more network devices. Then, identifying each configuration change, generating an impact value for the configuration change and generating a recommendation for the one or more network devices based on the impact value.

In an aspect of the present disclosure, a method for dynamically controlling quality of a video displaying on a display associated to an electronic device is provided. The method comprises detecting current eye position of a user and identifying at least one region of interest (ROI) on a display screen of the display device based on the current eye position of the user. Then, the method comprises predicting next position of the eye based on at least one of the current eye position of the user or the at least one ROI. Also, the method comprises converting the SD video in to a high definition (HD) video displayed on the ROI on the display screen associated with the current and next position of the eye. Further, the method comprises displaying the HD video on the ROI of the display screen.

In an embodiment of the present disclosure, a display device for dynamically controlling quality of a video is provided. The display device comprises a processor and a memory communicatively coupled to the processor. The memory stores processor-executable instructions, which, on execution, cause the processor to detect current eye position of a user, identify at least one region of interest (ROI) on a display screen of the display device based on the current eye position of the user, predict next position of the eye based on at least one of the current eye position of the user or the at least one ROI, convert the SD video in to a high definition (HD) video displayed on the ROI on the display screen associated with the current and next position of the eye and display the HD video on the ROI of the display screen.

In another aspect of the present disclosure, a non-transitory computer readable medium is disclosed. The non-transitory computer readable medium includes instructions stored thereon that when processed by a processor causes a device to perform operations comprising detecting current eye position of a user. The operation also comprises identifying at least one region of interest (ROI) on a display screen of the display device based on the current eye position of the user. The operations further comprise predicting next position of the eye based on at least one of the current eye position of the user or the at least one ROI. The operations furthermore comprise converting the SD video in to a high definition (HD) video displayed on the ROI on the display screen associated with the current and next position of the eye, and displaying the HD video on the ROI of the display screen.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

DETAILED DESCRIPTION

Figure 1:
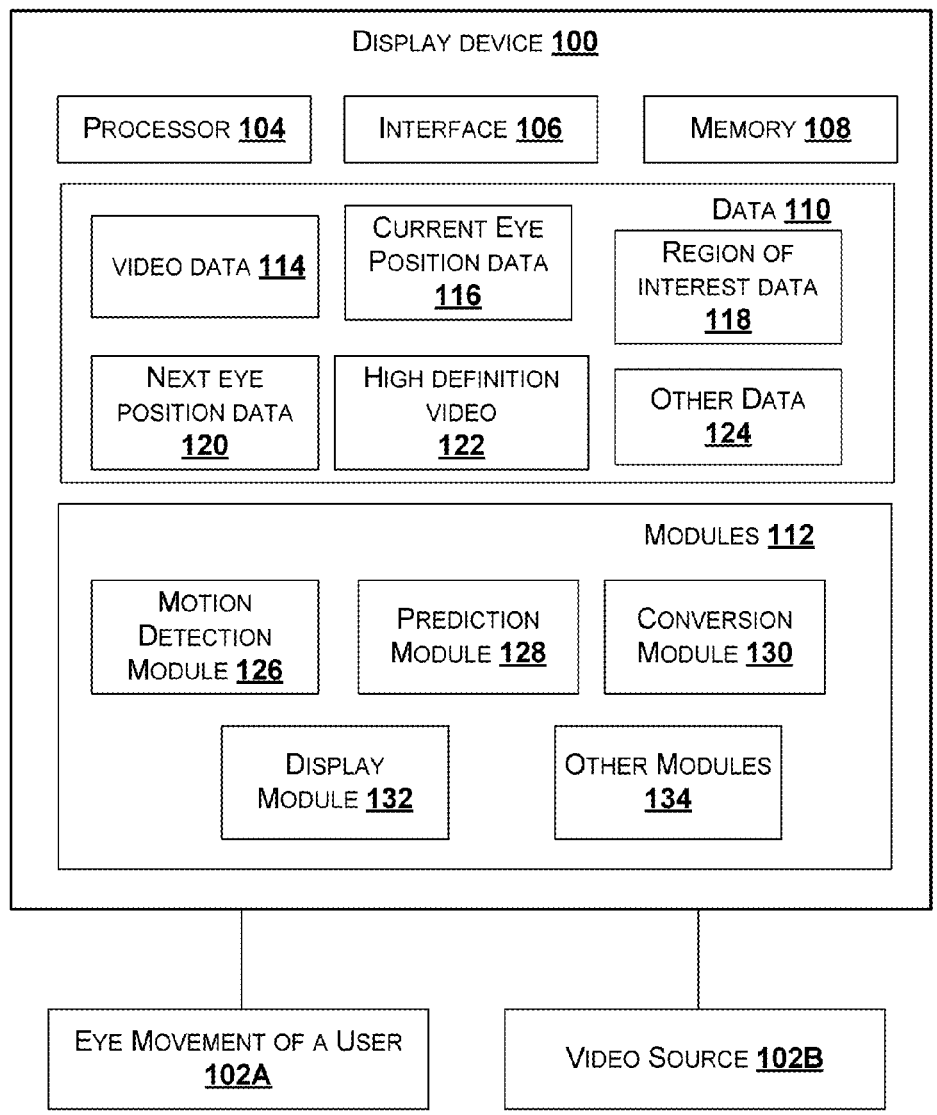
FIG. 1 illustrates a block diagram of an exemplary display device for dynamically controlling quality of a video displaying on a display associated to an electronic device, in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure are related to a method and a display device for dynamically controlling quality of a video displaying on a display associated to an electronic device. The device detects current eye position of a user and identifies at least one region of interest (ROI) on a display screen of the display device. The display device predicts next position of the eye, converts the SD video in to a high definition (HD) video displayed on the ROI on the display screen associated with the current and next position of the eye; and displaying high definition video on the ROI of the display screen.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary display device 100 for dynamically controlling quality of a video displaying on a display screen in accordance with some embodiments of the present disclosure. The display device 100 monitors the eye position of a user through a motion sensor, in one embodiment of the present disclosure. It may be understood by a person skilled in the art that any other sensor can be used with method of the present disclosure.

The display device 100 may include at least one central processing unit ("CPU" or "processor") 104 and a memory 108 storing instructions executable by the at least one processor 104. The processor 104 may comprise at least one data processor for executing program components for executing user- or system-generated requests. A user may include a person, a person using a device such as those included in this disclosure, or such a device itself. The memory 108 is communicatively coupled to the processor 104. In an embodiment, the memory 108 stores one or more eye position data associated with the user. The display device 100 further comprises an I/O interface 106. The I/O interface 106 is coupled with the processor 104 through which the input is received.

In an embodiment, one or more data 110 may be stored within the memory 108. The one or more data 110 may include, for example, standard definition (SD) video data 114, current eye position data 116, region of interest (ROI) data 118, next eye position data 120, high definition (HD) video data 122 and other data 124.

The video data 114 is displayed on the display screen of the display device. The video data 114 is received from a video source. In one embodiment, the video source is a standard definition video source. The video data comprises plurality of SD images also referred as SD frames.

The current eye position data 116 is associated with a user's eye movement or also referred as dwell position. The current eye position is detected using an optical eye tracking technique, such a, but not limited to video oculography, pattern mapping and gaze based interface.

The region of interest (ROI) data 118 is associated with the user focusing on the display screen using the eye movement. The ROI is obtained based on the current eye position of the user focusing on the display screen of the display device. In one embodiment, a binary space partitioning technique is used to obtain the eye direction vector onto the display screen space, by a user, thereby, obtaining the ROI.

The next eye position data 120 is associated with the prediction of the next eye position of the user, focusing on the display screen. The next eye position of the user is also referred as next dwelling position.

The high definition (HD) video data 122 is data associated with converted images with improved quality on the ROI. The SD video is converted in to the HD video and displayed on the display screen of the display device.

In an embodiment, the data 110 in the memory 108 is processed by the modules 112 of the processor 104. The modules 112 may be stored within the memory 108. Also, the modules can be implemented in any suitable hardware, software, firmware, or combination thereof.

In one implementation, the modules may include, for example, a motion detection module 126, a prediction module 128, a conversion module 130, and a display module 132. The display device 100 may also comprise other modules 134 to perform various miscellaneous functionalities of the device 100. It will be appreciated that such aforementioned modules may be represented as a single module or a combination of different modules.

In an embodiment, the motion detection module 126 also referred as motion detector the motion detection module 126 of the display device 100 detects the eye movement of the user. In an example embodiment, when a user is watching a video or image displayed on a display screen of the display device 100, the motion detector 126 detects the eye movement. The detected eye movement is recorded as current eye position, which is also referred as the current dwell position of the eye.

The motion detection module 126 detects the current eye position using an optical eye tracking technique, such a, but not limited to video oculography, pattern mapping and gaze based interface. In one embodiment of detecting current eye position using video oculography, an infrared light is reflected from the eye and sensed by at least one of a video camera and an optical sensor. The information or data is analyzed to extract eye rotation from changes in reflections of the infrared light. This information is the current eye position data.

In one embodiment by using pattern mapping, the eye movement is recorded by ways of video or photographing continuously. The variation in size and shape of sclera i.e. white region of eye and iris, the black region of eye, are fed to a pattern mapping algorithm to obtain the eye rotation and look direction vector in 3-dimension (3D). In one embodiment, the current eye position is identified using a gaze based interface for analyzing human eye gaze behaviors to reveal characteristics of human communication and cognition.

The ROI is obtained based on the current eye position of the user focusing on the display screen of the display device. The other region of the display screen is non-ROI. In one embodiment, a binary space partitioning technique is used by the motion detection module 126 to obtain the eye direction vector onto the display screen space, by a user, thereby, obtaining the ROI.

The motion prediction module 128 predicts next eye position of the user, focusing on the display screen. The next eye position of the user is also referred as next dwelling position. The motion prediction module 128 predict next position of the eye, also referred as next dwell position of the eye, based on at least one of the current eye position of the user and the ROI. The next dwell position of the eye may be predicted using an artificial neural network based on at least one of inputs such as, but not limited to, present coordinates on the display screen, the degree of motion or motion vectors in the neighboring pixels or objects, scene change or change in frame and change in color.

In one embodiment, the motion prediction module 128 predicts the next eye position based on user profile data. The motion prediction module 128 is configured with plurality of users profile data. Based on a specific user, the display device tracks the eye movement for a predetermined time with respect to the objects or scene displayed on the display screen. For example, a user eyes dwell in a war scene which includes killing and crying of people. The motion prediction module 128 uses the relative motion of eye with respect to moving objects displayed, which plays a significant role on the quality of the video. The eye movement and rate of eye movement of different user's is different, based on the moving objects on the displayed screen. The motion prediction module 128 is configured to learn the rate of movement of eye for each user during transients, based on the detected eye movement by the motion detection module 126 to predict the next eye position and temporal resolution i.e. number of HD frames required during transition. During the transition, the next eye position the number of HD frames required at ROI are combined, and rendered with higher frame rates.

In one embodiment, as a human eye may not focus to a point on the display but to a small region, hence the motion prediction module 128 is configured with a threshold to overcome the aberration of human eye. The motion prediction module 128 performs a consistent shift at least 3 pixels in plurality of frames, may be four or five frames before shifting moving the eye focus to next point. The motion prediction module 128 uses motion vectors of ROI to compute the eye focus position or gaze position.

Also, the motion prediction module 128 predicts which part of an image or referred as frame of a video, is to be coded with high definition (HD) in the next frame uses at least one available resources such as, but not limited to, bandwidth, and processing power. In one example embodiment, at the network level in a live video chat scenario, the video packets that fall with-in the ROI may be assigned with high priority, relative to other packets in other parts of the scene.

Figure 2A:
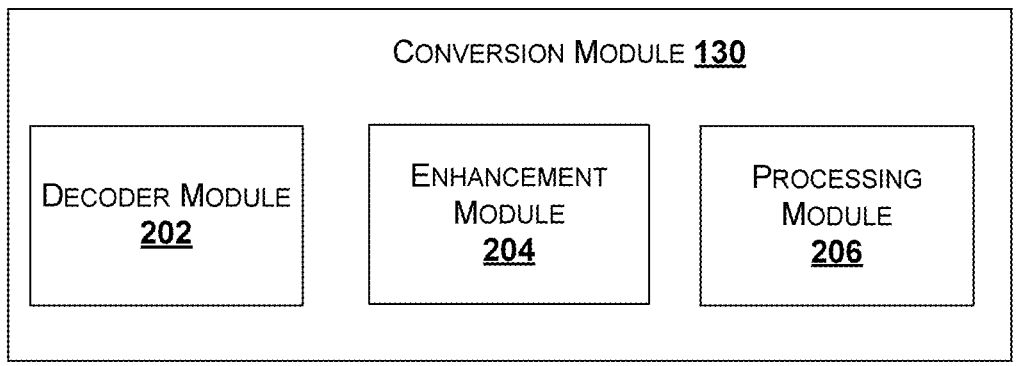
FIG. 2A illustrates an exemplary block diagram of a conversion module in accordance with some embodiments of the present disclosure.

The conversion module 130 converts each image of the SD video into a high definition video, i.e. image of high definition (HD) at the ROI on the display screen. The sub modules of the conversion module 130 are illustrated in FIG. 2A. The sub modules of the conversion module 128 comprise a decoder module 202, an enhancement module 204 and a processing module 206.

The decoder module 202 comprises a standard definition decoder providing for a reduced resolution. In one embodiment, the decoder module 202 supports frame rates of at least one of 24 frames per second (fps) and 30 fps. In one embodiment, decoder module 202 is configured with one of sobel filtering and frangi filter for extracting the objects or frames of the SD video. After the extraction of the frames corresponding to the SD video, the conversion of SD in to HD video is performed. The conversion of SD video in to HD comprises up sampling of images with multiple reference frames referred as super resolution.

The conversion from SD to HD comprises interpolation of pixels by performing spatial up sampling, estimating motion vectors of ROI for estimating next prediction position. Based on the next predicted position weightage is assigned for the image in that direction and frames are temporally interpolated to virtually enhance the frame rate. The ROI as well as the ROI in the next image or frame are rendered with higher frame rates with temporal interpolation to facilitate smoother transition so that, only ROI will be rendered with high frame rates in the backdrop of SD video. The non ROI may be rendered with low frame rates compared to the frame rates of ROI. Thus, the decoder module 202 provides each image having HD at the ROI, converting the SD video into HD video.

The enhancement module 204 receives plurality of images associated with the converted HD video from the conversion module 202. The enhancement module 204 enhances image quality of each of the plurality of images in the converted HD video by performing filtering operation to remove noise from the plurality of image. The filtering process is performed by at least one of the filters such as, but not limited to, Weiner filter and Gaussian filter.

The processing module 206 receives the enhanced plurality of images associated with the converted HD video. The processing module 206 performs post processing on the enhanced images for rendering high resolution content at the ROI. The non-ROI region shall be having low resolution or quality compared to the ROI. Thus, the content of user attention is rendered with high quality (low quantization step). The rest of the display screen may have lower resolution and the overall bit rate required to improve the quality of video being displayed is low.

Figure 2B:
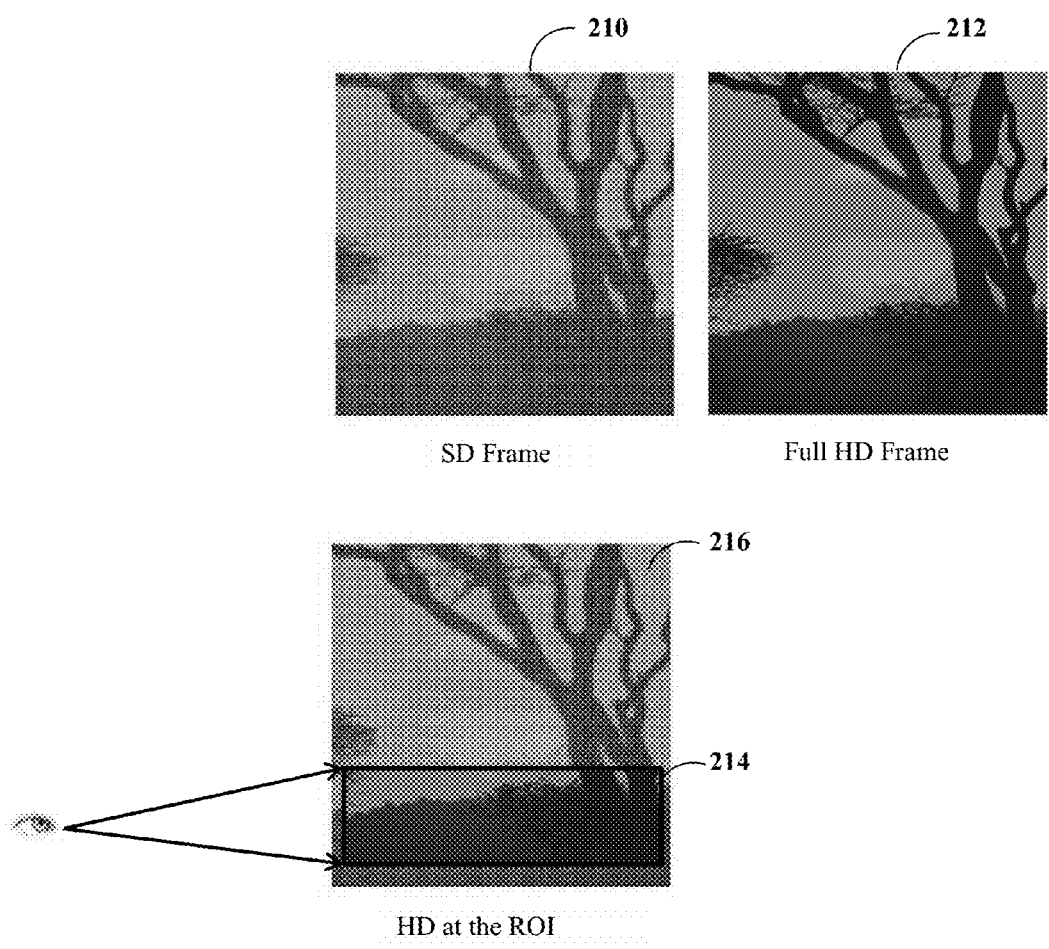
FIG. 2B illustrates an example for dynamically controlling quality of a video displaying on a display device in accordance with some embodiments of the present disclosure.

Referring bask to FIG. 1, the display device 100 comprises a display module 132 to display the high resolution video content at the ROI which the user attention is rendered. This is shown in FIG. 2B, illustrates an example for dynamically controlling quality of a video displaying on a display device. As shown in FIG. 2B, an image 210 is an SD frame or image, an image 212 is a HD image or frame and an image or frame 216 is displayed on the display screen of the display device, which comprises HD content at the ROI 214, where the user focuses on the display screen.

Figure 3:
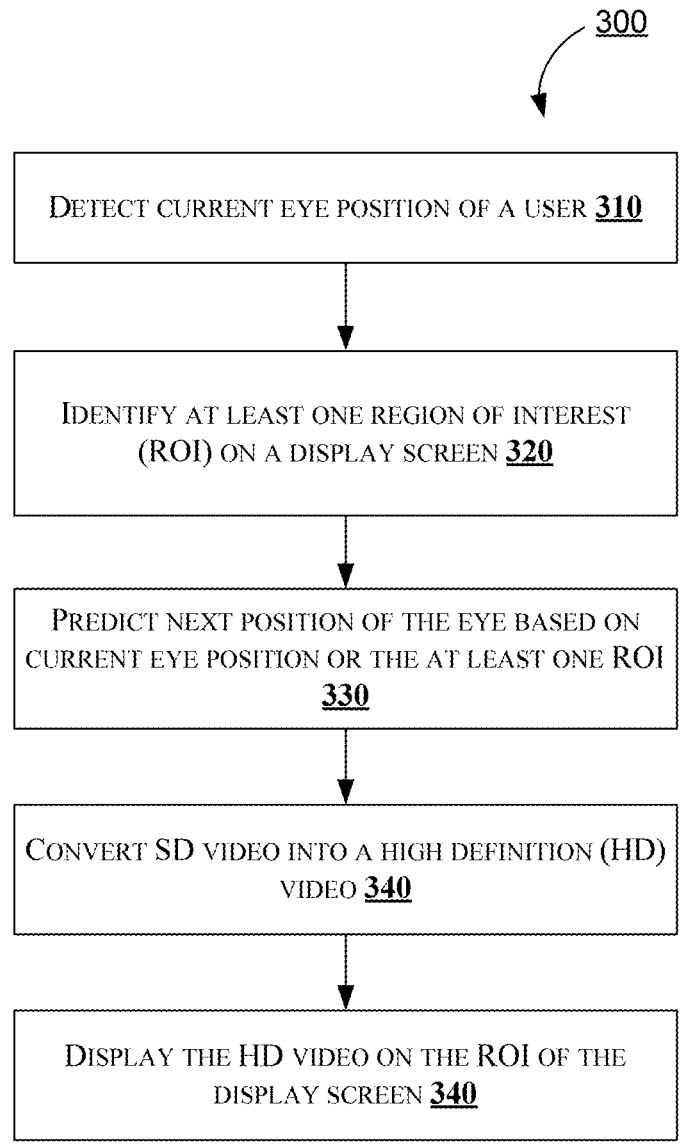
FIG. 3 shows a flowchart illustrating a method for dynamically controlling quality of a video displaying on a display associated to an electronic device in accordance with some embodiments of the present disclosure.

FIG. 3 shows a flowchart illustrating a method for dynamically controlling quality of a video displaying on a display associated to an electronic device in accordance with some embodiments of the present disclosure.

As illustrated in FIG. 3, the method 300 comprises one or more blocks for displaying a video by dynamically controlling quality of a video displaying on a display associated to an electronic device. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 310, detect current eye position of a user. In an embodiment, the motion detection module 126 of the display device 100 detects the eye movement of the user. For example, when a user is watching a video or image on a display screen or monitor of the display device 100, the motion detector 126 detects the eye movement, which is recorded as current eye position or also referred as the current dwell position of the eye.

At block 320, identify at least one region of intersection (ROI) on the display screen of the display device. In one embodiment, the ROI on the display is identified based on the eye movement of the user using a binary space partitioning technique.

At block 330, predict next position of the eye, also referred as next dwell position of the eye, based on at least one of the current eye position of the user or the at least one ROI. The next dwell position of the eye may be predicted using an artificial neural network based on at least one of inputs such as, but not limited to, present coordinates on the display screen, the degree of motion or motion vectors in the neighboring pixels or objects, scene change or change in frame and change in color. In one embodiment, the prediction of the next position of eye is based on personal profile of the user. Depending upon the user, the display device system observes the eye movement for a predetermined time with respect to the objects or scene displayed on the display screen. For example, a user eyes dwell in a war scene which includes killing and crying of people. This involves the relative motion of eye with respect to moving objects displayed, which plays a significant role on the quality of the video. As different users eye movement is different and rate of eye movement is also different based on the moving objects on the displayed screen. The display device is configured to learn rate of movement of eye for each user during transients and considers the same, during the prediction step at block 330.

At block 340, convert the standard definition (SD) video in to a high definition (HD) video displayed on the ROI on the display screen associated with the current and next position of the eye. In one embodiment, decoder module 202 is configured with one of sobel filtering and frangi filter for extracting the objects or frames of the SD video. After the extraction of the frames corresponding to the SD video, the conversion of SD in to HD video is performed. The conversion of SD video in to HD essentially involves up sampling of images with multiple reference frames, referred as super resolution. The conversion comprises interpolation of pixels by performing spatial up sampling, estimating motion vectors of ROI for estimating next prediction position. Based on the next predicted position weightage is assigned for the image in that direction and frames are temporally interpolated to virtually enhance the frame rate. The ROI of interest as well as the ROI in the next image or frame are rendered with higher frame rates with temporal interpolation to facilitate smoother transition so that, only ROI will be rendered with high frame rates in the backdrop of SD video.

Next, the image quality of the ROI is enhanced by filtering process for removal of noise. The filtering process is performed by at least one of the filters such as, but not limited to, Weiner filter and Gaussian filter. Thereafter, performing post processing is performed on the enhanced image for rendering high resolution content at the determined ROI. The non-ROI region shall be having low resolution or quality compared to the ROI.

At block 350, display the images associated with the video are displayed on the display screen, wherein the image quality on the ROI is high which is HD and non ROI shall be having SD quality.

Thus, the method and the device provide dynamically controlling quality of a video displaying on a display associated to an electronic device.

Computer System

Figure 4:
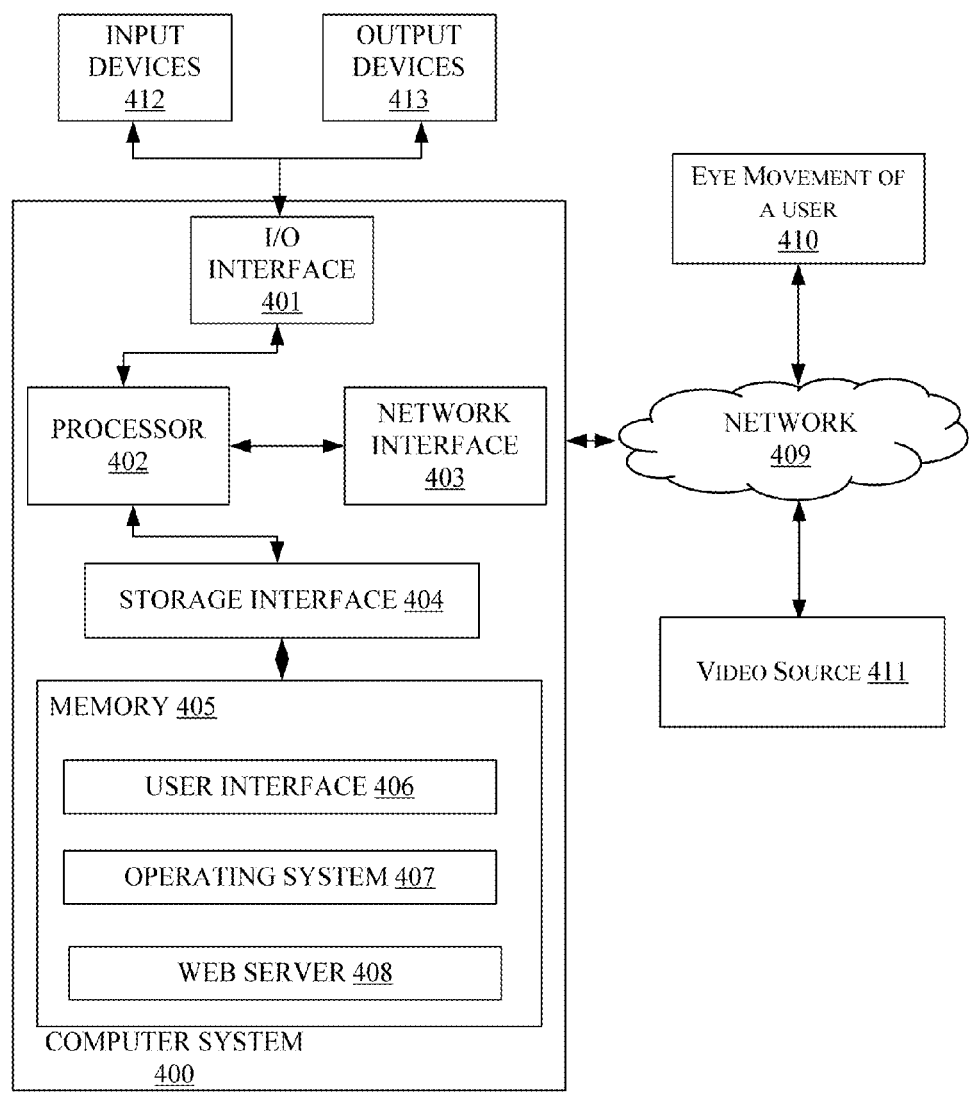
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the display device 100. The computer system 400 is for dynamically controlling quality of a video displaying on a display. The computer system 400 may comprise a central processing unit ("CPU" or "processor") 402. The processor 402 may comprise at least one data processor for executing program components for executing user- or system-generated business processes. A user may include a person, a person using a device such as such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (412 and 413) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices (412 and 413). For example, the input device 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 413 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with one or more network devices 410.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment, the present disclosure provides a robust and adaptive high quality video content at rendering.

In an embodiment of the present disclosure, bandwidth requirement is reduced.

In an embodiment, the present disclosure provides enhanced user satisfaction of consumption of high quality video.

In an embodiment, the present disclosure always provides high quality video ensured on the object being watched by the user.

In an embodiment, the present disclosure provides a new video format based on the ROI, high definition (HD) video in ROI and standard definition (SD) video in the rest of the region (non-ROI) a frame-by-frame basis, which may be subjected to a compression algorithm such as, but not limited to, MPEG.

The described operations may be implemented as a method, system or article of manufacture using standard programming and/or engineering techniques to produce software, firmware, hardware, or any combination thereof.

The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for dynamically controlling quality of a displayed video, comprising:
   detecting, by a display device, a current eye position of an eye of a user;
   identifying, by the display device, at least one region of interest (ROI) on a display screen of the display device based on the current eye position of the user;
   predicting, by the display device, a next position of the eye of the user based on the current eye position of the user or the at least one ROI;
   converting, by the display device, a standard definition (SD) video into a high definition (HD) video; and
   displaying, by the display device, the HD video on the ROI of the display screen and the SD video in the non-ROI of the display screen, wherein detecting the current eye position of the user is performed by a motion detector, using optical eye tracking, using pattern mapping, or using a gaze-based interface technique and identifying the at least one ROI on the display screen is performed using binary space partitioning.

2. The method as claimed in claim 1, wherein predicting the next position of the eye comprises:
   receiving at least one of, one or more parameters associated with the SD video displayed on the display screen and at least one user profile;
   predicting the next position of the eye based on the one or more parameters, the at least one user profile, or at least one resource; and
   obtaining one or more frames of the SD video based on the predicted next position of the eye using an artificial neural network.

3. The method as claimed in claim 2, wherein the one or more parameters are present coordinates on the display screen, plurality of motion vectors in one of neighboring pixels and objects, frame color, or color change in the frames of the SD video.

4. The method as claimed in claim 1, wherein converting the SD video into the HD video further comprises performing spatial up-sampling at least one of a plurality of frames in the ROI or a plurality of frames in an at least one ROI associated with the next position of the eye, wherein the spatial up-sampling of the plurality of frames is performed by an interpolating technique.

5. The method as claimed in claim 1, wherein displaying the HD video on the ROI of the display screen further comprises eliminating at least one of interference or a noise in the HD video.

6. A display device comprising at least one processor and a memory coupled to the processor which is configured to be capable of executing programmed instructions comprising and stored in the memory to:
 detect a current eye position of an eye of a user;
 identify at least one region of interest (ROI) on a display screen of the display device based on the current eye position of the user;
 predict a next position of the eye of the user based on the current eye position of the user or the at least one ROI;
 convert a standard definition (SD) video into a high definition (HD) video; and
 display the HD video on the ROI of the display screen and the SD video in the non-ROI of the display screen, wherein detecting the current eye position of the user is performed by a motion detector, using optical eye tracking, using pattern mapping, or using a gaze-based interface technique and identifying the at least one ROI on the display screen is performed using binary space partitioning.

7. The display device as claimed in claim 6, wherein the processor coupled to the memory is further configured to be capable of executing at least one additional programmed instruction to:
 receive at least one of, one or more parameters associated with the SD video displayed on the display screen and at least one user profile; predict the next position of the eye based on the one or more parameters, the at least one user profile, or at least one resource; and
 obtain one or more frames of the SD video based on the predicted next position of the eye using an artificial neural network.

8. The display device as claimed in claim 7, wherein the one or more parameters are present coordinates on the display screen, plurality of motion vectors in one of neighboring pixels and objects, frame color, or color change in the frames of the SD video.

9. The display device as claimed in claim 6, wherein the processor coupled to the memory is further configured to be capable of executing at least one additional programmed instruction to perform spatial up-sampling at least one of a plurality of frames in the ROI or a plurality of frames in an at least one ROI associated with the next position of the eye, wherein the spatial up-sampling of the plurality of frames is performed by an interpolating technique.

10. The display device as claimed in claim 6, wherein the processor coupled to the memory is further configured to be capable of executing at least one additional programmed instruction to eliminate at least one of interference or a noise in the HD video.

11. A non-transitory computer readable medium having stored thereon instructions for transferring data in a storage cluster comprising executable code which when executed by a processor, causes the processor to perform steps comprising:
 detecting a current eye position of an eye of a user;
 identifying at least one region of interest (ROI) on a display screen of the display device based on the current eye position of the user;
 predicting a next position of the eye of the user based on the current eye position of the user or the at least one ROI;
 converting a standard definition (SD) video into a high definition (HD) video; and
 displaying the HD video on the ROI of the display screen and the SD video in the non-ROI of the display screen, wherein detecting the current eye position of the user is performed by a motion detector, using optical eye tracking, using pattern mapping, or using a gaze-based interface technique and identifying the at least one ROI on the display screen is performed using binary space partitioning.

12. The non-transitory computer readable medium of claim 11, wherein predicting the next position of the eye comprises:
 receiving at least one of, one or more parameters associated with the SD video displayed on the display screen and at least one user profile;
 predicting the next position of the eye based on the one or more parameters, the at least one user profile, or at least one resource; and
 obtaining one or more frames of the SD video based on the predicted next position of the eye using an artificial neural network.

13. The non-transitory computer readable medium of claim 12, wherein the one or more parameters are present coordinates on the display screen, plurality of motion vectors in one of neighboring pixels and objects, frame color, or color change in the frames of the SD video.

14. The non-transitory computer readable medium of claim 11, wherein converting the SD video into the HD video further comprises performing spatial up-sampling at least one of a plurality of frames in the ROI or a plurality of frames in an at least one ROI associated with the next position of the eye, wherein the spatial up-sampling of the plurality of frames is performed by an interpolating technique.

15. The non-transitory computer readable medium of claim 11, wherein displaying the HD video on the ROI of the display screen further comprises eliminating at least one of interference or a noise in the HD video.

* * * * *